Aug. 15, 1967
G. V. WOODLING
3,335,592
METAL FOIL AND APPARATUS AND METHOD
FOR DISPENSING METAL FOIL
Filed Dec. 18, 1963
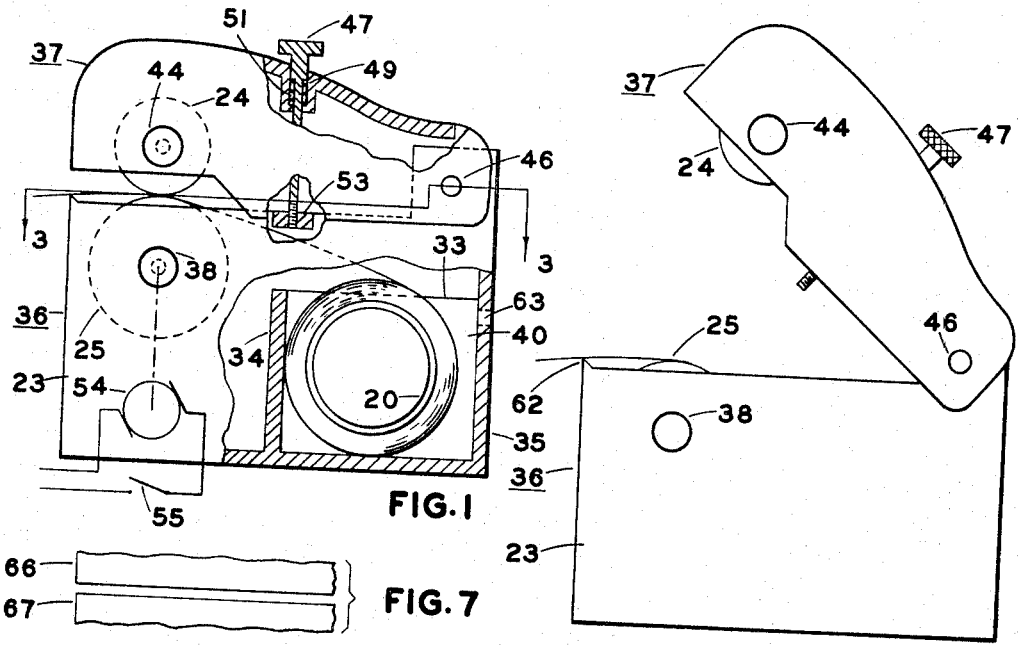
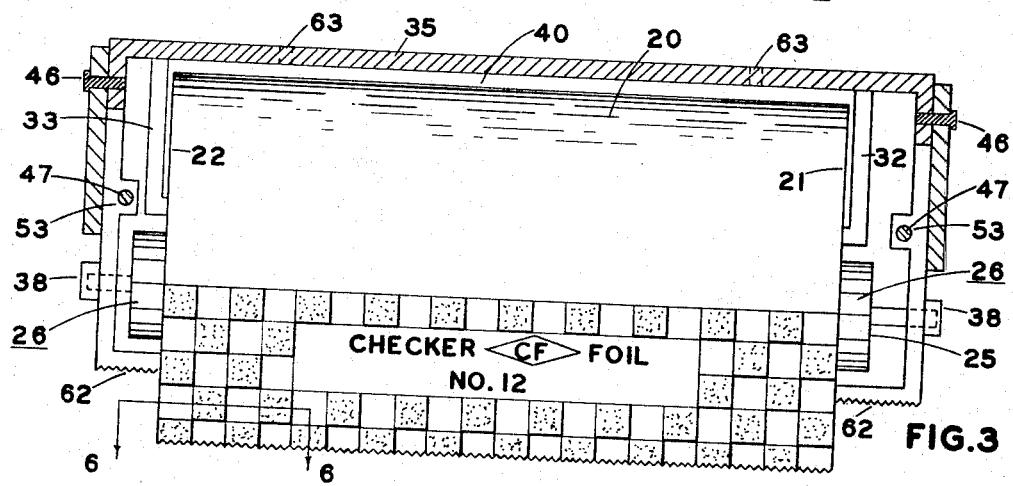
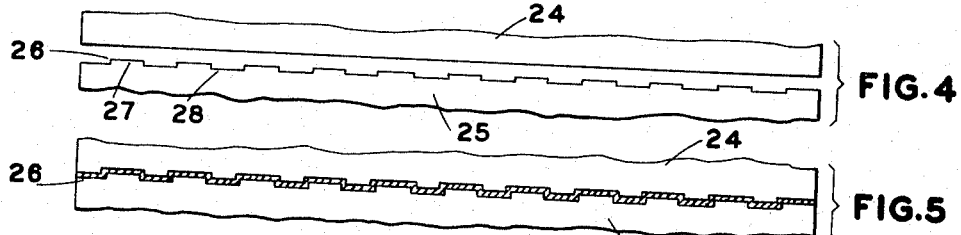
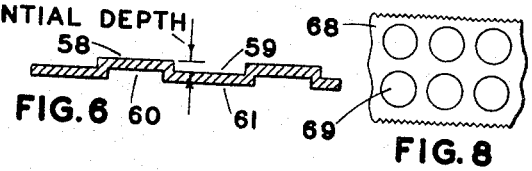
INVENTOR.
GEORGE V. WOODLING
BY
Woodling, Krost, Granger and Rust
Attys.

United States Patent Office 3,335,592
Patented Aug. 15, 1967

3,335,592
METAL FOIL AND APPARATUS AND METHOD FOR DISPENSING METAL FOIL
George V. Woodling, 22077 W. Lake Road, Rocky River, Ohio 44116
Filed Dec. 18, 1963, Ser. No. 331,626
3 Claims. (Cl. 72—196)

This application is a continuation-in-part of my application Ser. No. 85,895, filed Jan. 30, 1961, now abandoned, for Kitchen Metal Foil, and of my application Ser. No. 107,247, now abandoned, for Metal Foil Having Repeatable Pattern.

My invention relates to metal foil and apparatus and method for dispensing metal foil.

The metal foil comprises thin metal kitchen foil for use in cooking, baking and other kitchen operations. The thin metal kitchen foil is preferably made of aluminum or other suitable metal. In practice, the thin metal kitchen foil may be as thin as .0005 inch but is seldom thicker than .002 or .005 inch.

An object of the invention is the provision of a metal foil strip having on opposite sides thereof raised and depressed areas of a repeatable pattern wherein the pattern on one side is reciprocal of the pattern on the other side.

Another object of the invention is the provision of a foil wherein local depressed areas function somewhat like vacuum cups.

Another object is the provision of a metal foil to keep cookies and other baked food from sticking to the foil.

Another object is the provision of the metal foil wherein shortening, butter, grease, and other cooking mediums may be kept from running underneath the item being cooked or baked.

Another object of the invention is the provision of a thin metal kitchen foil for use in cooking, baking or other kitchen operations and upon which butter, grease, shortening and other mediums may be employed to prevent the food being prepared from sticking thereto.

Another object of the invention is the provision of form-working the metal foil to impede wrinkling and to produce a texture whereby sheets torn from the foil are more obedient to use.

Another object of the invention is the provision of a metal foil having on opposite sides thereof high and low reciprocal or negative impressionable surface areas depicting a pattern or indicia of the class including designs, symbols, figures, circles, squares, checks, pictures, words and letters, numbers and trademarks, wherein the low surface areas form individual pockets discontinuous from each other.

Another object of the invention is the provision of a dispenser for metal foil rolls, wherein the foil is work-treated as it is dispensed to render the foil more manageable.

Another object of the invention is the provision of a dispenser having dispensing rolls, wherein one of said rolls has a pattern or indicia on the cylindrical surface thereof constituting traction means to aid in drawing said foil through said rolls for dispensing same.

Another object of the invention is the method of dispensing and severing a strip of foil from a roll of plain foil and including the steps of withdrawing a strip of plain foil from the foil roll and forming a plurality of impressionable pockets in the strip of foil as it is withdrawn from the foil roll, and finally severing the pocket-formed strip from the foil roll.

Other objects and a fuller understanding of the invention may be had by referring to the following description and claims taken in conjunction with the accompanying drawing, in which:

FIGURE 1 is a side elevational view of a dispenser embodying the features of my invention, parts being shown in section to illustrate internal structures;

FIGURE 2 is a view similar to FIGURE 1 but showing the top roll means in a raised position, whereby available space is provided between the top and bottom roll means through which a foil roll may be inserted into the housing;

FIGURE 3 is a cross-sectional view taken along the line 3—3 of FIGURE 1, showing a strip of foil being formed with an impressionable indicia of a checkerboard design;

FIGURE 4 is a fragmentary and front view of the top and bottom roll means, with the roll means slightly separated to illustrate the indicia on the bottom roll with only the top line indicia being shown;

FIGURE 5 is a view similar to FIGURE 4 but showing a foil between the roll means with only the top line indicia being shown;

FIGURE 6 is an enlarged cross-sectional view of the dispensed foil, taken along the line 6—6 of FIGURE 3;

FIGURE 7 is a fragmentary view of modified roll means, wherein both roll means have smooth outer cylindrical surfaces between which the dispensed foil is work-treated to render it more manageable; and FIGURE 8 is a fragmentary view of a foil having circle indicia.

With reference to the drawings, the foil roll to be dispensed is identified by the reference character 20. The foil on the roll is plain and is wrapped about a hollow spool having a longitudinal axis. The wrapped foil has end edges 21 and 22 spaced longitudinally apart from each other and defines the lateral width of a strip of foil as it is dispensed from the foil roll. The foil to be dispensed has a thickness in a range of approximately .0005 to .005 inch and is preferably made of aluminum of the ordinary kitchen foil type.

The dispenser comprises a housing 23 and top and bottom roll means 24 and 25 between which the foil is dispensed. The housing may be made of plastic, metal or any other suitable material. The back wall 35 thereof may have mounting holes 63, whereby the housing may be fastened to a wall or suitable supports. The bottom roll means 25 comprises indicia roll means having a substantially hard cylindrical surface with indicia means 26 thereon. The indicia means 26 includes at least a high or raised surface means 27 and a low or depressed surface means 28. The high and low surface means depict a pattern or indicia of the class which may include designs, symbols, figures, circles, squares, checks, pictures, words and letters, numbers and trademarks. The bottom roll means may be made of metal, plastic or any other suitable material and the indicia may be formed by molding, by modern machining methods, by etching or any other suitable means. The differential depth between the high and low surface areas 27 and 28 is sufficient to make a duplicated impressionable indicia on the foil being dispensed. The differential depth may preferably reside in a range of approximately .0005 to .005 inch, and is preferably less than that amount which would tend to rupture the foil as it is dispensed, and preferably may not exceed .010 inch.

The top roll means 24 has a cylindrical surface preferably of softer material than that of the bottom roll means and is impressionable to conform to the high and low surface means 27 and 28. The indicia comprising the high and low surface means constitutes traction means to aid in driving the foil through the roll means, the top and bottom roll means having a longitudinal length greater than the width of the sheet of foil being dispensed therebetween. The housing 23 has end guide walls 32 and 33 between which the foil roll 20 is mounted and constitute end guide means to align the end edges 21 and 22 of the foil roll within the longitudinal limits of the top and bottom roll means. The longitudinal distance between the end guide walls 32 and 33 is less than the longitudinal length of the top and bottom roll means 24 and 25. The housing 23 has a front guide wall 34 to keep the foil roll from rolling forward toward the bottom roll means 25 as the foil is unwrapped. The foil roll is thus confined in a guide compartment 40 defined by the end guide walls 32 and 33 and the front guide wall 34 and the back wall 35 of the housing. The foil roll 20 revolves in this compartment as it is unwrapped.

The housing 23 is divided into a lower part 36 and an upper part 37. The lower part 36 has first mounting means comprising bearing means 38 to mount the bottom roll means 25 to rotate about its longitudinal axis and substantially parallel to the longitudinal axis of the foil roll 20 disposed in the housing. The upper part 37 has second mounting means comprising bearing means 44 to mount the top roll means 24 to rotate about its longitudinal axis and substantially parallel to the longitudinal axis of the foil roll 20. The first and second mounting means respectively align the bottom and top roll means to rotate relative to each other with their respective longitudinal axes parallel to each other.

The upper part 37 of the housing is pivotally connected to the lower part 36 of the housing by pivot pin or means 46. The FIGURE 2 shows the upper part 37 in its raised position, movably separating the top roll means 24 from the bottom roll means 25, whereby available space is afforded through which the foil roll may be inserted into the guide compartment 40 of the housing. The FIGURE 1 shows the dispenser in its dispensing position and in this position the upper part 37 of the housing is constrained toward the lower part 36 by means of fastening screws 47 around which are respectively mounted springs 49. The springs may be respectively disposed in sockets 51. The lower end of the screws 47 respectively engage threaded lug portions 53. The tightening of the screws against the springs causes the top roll means 24 to be constrained or pressed downwardly against the bottom roll means.

The roll means may be driven or rotated by suitable drive means, such as an electric motor 54 controlled by a switch 55. The motor 54 may be connected to drive the bottom roll means 25 through suitable speed reducing means such as gears.

In operation, it is only necessary to operate the switch 55, whereupon the foil is dispensed through the roll means. As the foil passes through the roll means, the foil is impressionably formed by mating or duplicating the high and low surface areas 27 and 28 of the indicia means on the bottom roll means. The indicia or pattern is impressionably transferred to the foil in like dimensions. On the top side of the foil, the high and low impressionable surface areas 58 and 59 (see FIGURE 6) have a differential depth therebetween measured by the depth of the indicia on the bottom roll means 25. On the bottom side of the foil, the high and low impressionable surface areas 60 and 61 have the same differential depth therebetween, but being reciprocal or negative to that on the top side of the foil. The indicia so duplicated may be of the class including designs, symbols, figures, circles, squares, checks, pictures, words and letters, numbers and trademarks, wherein the low surface areas form individual pockets discontinuous from each other. The differential depth on the foil is preferably less than that amount which would tend to rupture the foil as it is dispensed, and preferably may not exceed .010 inch. The differential depth on the foil may preferably reside in a range of approximately .0005 to .005 inch.

After the foil passes through the roll means a suitable distance, the motor may be stopped by operating the switch 55, whereupon the dispensed foil may be severed by tearing same along the tear edge 62 on the housing.

When inserting a new foil roll in the housing, it is only necessary to unloosen the screws 47 and raise the upper part 37 of the housing to clear the space between the roll means, after which the used spool may be removed and a new foil roll mounted in the guide compartment 40. The upper part 37 may now be lowered, whereupon the screws may again be tightened, ready for operation.

In the drawing, the repeatable pattern is shown as a checkerboard pattern and preferably the raised and depressed areas are square, although they may be rectangular, diamond or octagonal in shape, as well as round. The depressed areas comprise discontinuous surfaces or pockets from one longitudinal edge of the foil to the other, whereby butter, grease, shortening or other mediums in the depressed area are impeded from running from one longitudinal edge to the other. The raised and depressed areas are form-worked, thereby reinforcing the foil. The raised and depressed areas are substantially flat throughout their entire areas but may be dome-shaped.

The foil with the local pockets tends to adhere to a smooth surface such as to a cookie sheet as if by suction or by an unexpected adherence caused by the form-worked texture. The use of the form-worked foil on a flat cookie sheet points up the adherence quality produced by the suction aspect or by the form-worked texture action of the present invention. Furthermore, the foil with the form-worked texture is less inclined to produce long wrinkles as that produced in plain foil when it is touched or handled. In other words, the foil with the form-worked texture of the present invention is more obedient to use than plain foil and less apt to produce long wrinkles.

In baking cookies a strip of the foil is placed on the cookie sheet which has a very smooth surface. The purpose of placing the cookies on the foil instead of directly on the cookie sheet is that it avoids the necessity of washing the cookie sheet after each batch of cookies is made in preparation for the next batch. When the form-worked foil of the present invention is placed upon the smooth surface of the cookie sheet and pressed down by a wiping action of the hand, the foil tends to stick or adhere as if by suction or by the form-worked texture action to the smooth surface of the cookie sheet, this being a condition which is not found when a smooth foil is applied to the cookie sheet. Also when a spoonful of cookie dough is placed on the form-worked foil-covered cookie sheet and the spoon is pulled away from the dough, there is a tendency for the spoon to lift the dough and the foil adhering to the dough from the cookie sheet, but because of the suction or form-worked texture action of the foil of this invention, the foil remains intact with the cookie sheet. When the same procedure is carried out with the use of a smooth foil, the dough and the foil adhering to the dough will lift up from the cookie sheet as the spoon breaks away from the dough. By the same token, the foil of the present invention, when placed on a smooth cookie sheet, is less inclined to shift sidewise as is the case when a smooth foil is used.

The size of the squares shown in the drawing may be preferably in the neighborhood of about ¼ inch to two inches. The designs, symbols, figures, circles, squares, checks, pictures, words and letters, numbers and trademarks may also preferably be in the neighborhood of ¼ inch to two inches. The width across the lines which delineate the designs, symbols, figures, circles, squares, checks, pictures, words and letters, numbers and trademarks may be from approximately .015 inch to ¼ inch.

In contrast with the smooth foil, when the foil of the present invention is formed by a rolling operation, the foil possesses a form-worked texture, which reinforces the foil in strength, in anti-wrinkling, or in obedience to flattening.

A foil embodying the present invention prevents cookies baked on the foil or other food baked or cooked within the foil from sticking to the foil. In addition, shortening, butter, grease, or other cooking material is precluded from escaping from underneath the cookies or other baked food on the foil. The depressed areas or pockets comprise puddles whereby the shortening, butter, grease or other cooking mediums are contained and prevents the cooking material from flowing from the one edge of the foil to the other edge. The foil of the present invention is capable of withstanding an extra amount of shock as the raised and depressed areas tend to level out to give a stretching action before any rupture can take place.

The dispensing roll means may be of a modified construction, in that both roll means 66 and 67 may have smooth surfaces, as shown in FIGURE 7, with no impressionable indicia. In these modified roll means, the foil is still roll-worked or work-treated to give a roll-worked texture so that the dispensed foil is less inclined to produce long wrinkles.

In FIGURE 8, there is shown a fragmentary piece 68 of dispensed foil which has circular indicia 69 with one side of the foil having circular grooves and the opposite side having circular ridges. The circles may range in diameter from ¼ inch to two inches and the width across the groove or ridge may be from approximately .015 inch to ¼ inch.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A dispenser for dispensing and severing a strip of foil from a roll of metal foil having a thickness in a range of approximately .0005 to .005 inch, said foil roll having end edges defining the lateral width of a strip of foil as it is dispensed from the foil roll, first and second dispensing roll means between which said foil may be dispensed from said foil roll, means for aligning said end edges of said foil roll within the longitudinal limits of said roll means, said roll means having a longitudinal length greater than the width of said sheet of foil dispensed therebetween, means to press said first and second roll means towards each other with said foil disposed for dispensing therebetween, said first roll means comprising indicia roll means having a substantially hard indicia working surface, said indicia working surface including at least high surface means and low surface means having a differential depth therebetween of an amount less than that which will tend to rupture the foil, said second roll means having an impressionable working surface of softer material than that of said indicia working surface and being impressionable to conform thereto, means for rotating said first roll means, said second roll means being rotated by the impressionable conformity of its working surface to that of said first roll means, and tear means upon which said dispensed foil may be severed from said foil roll.

2. A dispenser for dispensing and severing a strip of foil from a roll of metal foil having a thickness in a range of approximately .0005 to .005 inch, said foil roll having end edges defining the lateral width of a strip of foil as it is dispensed from the foil roll, first and second dispensing roll means between which said foil may be dispensed from said foil roll, means for aligning said end edges of said foil roll within the longitudinal limits of said roll means, said roll means having a longitudinal length greater than the width of said sheet of foil dispensed therebetween, means to press said first and second roll means towards each other with said foil disposed for dispensing therebetween, said first roll means comprising indicia roll means having a substantially hard indicia working surface, said indicia working surface including at least high surface means and low surface means having a differential depth therebetween of an amount less than that which will tend to rupture the foil, said second roll means having an impressionable working surface of softer material than that of said indicia working surface and being impressionable to conform thereto, said impressionable working surface and said indicia working surface defining an impressionable driving engagement between said dispensing roll means, means for rotating one of said dispensing roll means, said other roll means being rotated by said impressionable driving engagement, and tear means upon which said dispensed foil may be severed from said foil roll.

3. Method for dispensing and severing a strip of foil from a roll of plain foil having a thickness in a range of approximately .0005 to .005 inch, said foil roll being wrapped about a longitudinal axis and having end edges spaced longitudinally apart from each other and defining the lateral width of a strip of foil as it is dispensed from the foil roll, withdrawing a strip of plain foil from said foil roll and disposing it between a pair of roll means with one of said roll means having a substantially hard indicia working surface and with the other of said roll means having an impressionable working surface of softer material than that of said indicia working surface whereby said surfaces define with respect to each other an impressionable driving engagement with said foil strip disposed therebetween, indicia forming said foil strip by passing same between said surfaces with said pair of roll means being operated together as a unit through said impressionable driving engagement, and finally severing said indicia-formed strip from said foil roll.

References Cited

UNITED STATES PATENTS

| 1,807,141 | 5/1931 | Wood | 72—197 |
| 1,856,898 | 5/1932 | Wood | 72—197 |
| 2,382,045 | 8/1945 | Flowers | 29—552 |
| 2,545,866 | 3/1951 | Whitzel et al. | 29—193 |
| 2,632,495 | 3/1953 | Agee | 156—471 |
| 2,636,256 | 4/1953 | Rendleman | 29—193 |
| 2,827,286 | 3/1958 | Taylor | 226—90 |
| 3,017,697 | 1/1962 | Wlodek | 29—552 |
| 3,129,659 | 4/1964 | Lauer | 72—197 |

CHARLES W. LANHAM, *Primary Examiner.*

HYLAND BIZOT, *Examiner.*

K. C. DECKER, R. O. DEAN, *Assistant Examiners.*